US009134782B2

(12) United States Patent
Reddy et al.

(10) Patent No.: US 9,134,782 B2
(45) Date of Patent: Sep. 15, 2015

(54) MAINTAINING OPTIMUM VOLTAGE SUPPLY TO MATCH PERFORMANCE OF AN INTEGRATED CIRCUIT

(75) Inventors: Sreenivas Aerra Reddy, Castro Valley, CA (US); Srinivasan Arulanandam, Chennai (IN); Venkataraman Rajaraman, Hyderabad (IN)

(73) Assignee: NVIDIA CORPORATION, Santa Clara, CA (US)

( * ) Notice: Subject to any disclaimer, the term of this patent is extended or adjusted under 35 U.S.C. 154(b) by 1000 days.

(21) Appl. No.: 11/744,916

(22) Filed: May 7, 2007

(65) Prior Publication Data

US 2008/0282102 A1 Nov. 13, 2008

(51) Int. Cl.
*G06F 1/04* (2006.01)
*G06F 1/24* (2006.01)
*G06F 11/00* (2006.01)
*G06F 1/32* (2006.01)

(52) U.S. Cl.
CPC ............ *G06F 1/3203* (2013.01); *G06F 1/3296* (2013.01); *Y02B 60/1217* (2013.01); *Y02B 60/1285* (2013.01)

(58) Field of Classification Search
USPC .................................. 713/300, 500, 502, 503
See application file for complete search history.

(56) References Cited

U.S. PATENT DOCUMENTS

| 4,335,445 A | 6/1982 | Nercessian |
| 4,544,910 A | 10/1985 | Hoberman |
| 4,679,130 A | 7/1987 | Moscovici |
| 4,706,180 A | 11/1987 | Wills |
| 4,739,252 A | 4/1988 | Malaviya et al. |
| 4,868,832 A | 9/1989 | Marrington et al. |
| 4,893,228 A | 1/1990 | Orrick et al. |
| 5,086,501 A | 2/1992 | DeLuca et al. |
| 5,103,110 A | 4/1992 | Housworth et al. |
| 5,167,024 A | 11/1992 | Smith et al. |
| 5,177,431 A | 1/1993 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |

(Continued)

FOREIGN PATENT DOCUMENTS

| EP | 0381021 | 8/1990 |
| EP | 0474963 | 3/1992 |

(Continued)

OTHER PUBLICATIONS

Kelleher, et al.; NVID-P000620; A Processor Performance Adjustment System and Method; U.S. Appl. No. 10/295,619, filed Nov. 14, 2002.

(Continued)

*Primary Examiner* — Jaweed A Abbaszadeh
*Assistant Examiner* — Terrell Johnson

(57) ABSTRACT

Power supply voltage to an integrated circuit (IC) or a portion of an IC is maintained at an optimum level matching the IC performance. Voltage ranges and delay measures for corresponding operating frequencies are stored in tables in a voltage control block. When a new frequency of operation is desired, the voltage control block measures delay performance of the IC, and sets the supply voltage to a value specified in a corresponding entry in a table. The voltage control block then continues to measure delay performance, and dynamically adjusts the power supply voltage to an optimum value thereby minimizing power consumption.

33 Claims, 7 Drawing Sheets

(56) References Cited

U.S. PATENT DOCUMENTS

| | | | |
|---|---|---|---|
| 5,218,705 | A | 6/1993 | DeLuca et al. |
| 5,230,055 | A | 7/1993 | Katz et al. |
| 5,239,652 | A | 8/1993 | Seibert et al. |
| 5,254,878 | A | 10/1993 | Olsen |
| 5,300,831 | A | 4/1994 | Pham et al. |
| 5,307,003 | A | 4/1994 | Fairbanks et al. |
| 5,337,254 | A | 8/1994 | Knee et al. |
| 5,339,445 | A | 8/1994 | Gasztonyi |
| 5,350,988 | A | 9/1994 | Le |
| 5,396,443 | A | 3/1995 | Mese et al. |
| 5,410,278 | A | 4/1995 | Itoh et al. |
| 5,422,806 | A | 6/1995 | Chen et al. |
| 5,440,520 | A | 8/1995 | Schutz et al. |
| 5,446,365 | A | 8/1995 | Nomura et al. |
| 5,461,266 | A | 10/1995 | Koreeda et al. |
| 5,502,838 | A | 3/1996 | Kikinis |
| 5,511,203 | A | 4/1996 | Wisor et al. |
| 5,513,152 | A | 4/1996 | Cabaniss |
| 5,560,020 | A | 9/1996 | Nakatani et al. |
| 5,561,692 | A | 10/1996 | Maitland et al. |
| 5,568,103 | A | 10/1996 | Nakashima et al. |
| 5,568,350 | A | 10/1996 | Brown |
| 5,586,308 | A | 12/1996 | Hawkins et al. |
| 5,587,672 | A | 12/1996 | Ranganathan et al. |
| 5,589,762 | A | 12/1996 | Iannuzo |
| 5,590,342 | A | 12/1996 | Marisetty |
| 5,592,173 | A | 1/1997 | Lau et al. |
| 5,594,360 | A | 1/1997 | Wojciechowski |
| 5,630,110 | A | 5/1997 | Mote, Jr. |
| 5,648,766 | A | 7/1997 | Stengel et al. |
| 5,666,522 | A | 9/1997 | Klein |
| 5,675,272 | A | 10/1997 | Chu |
| 5,680,359 | A | 10/1997 | Jeong |
| 5,682,093 | A | 10/1997 | Kivela |
| 5,692,204 | A | 11/1997 | Rawson et al. |
| 5,710,929 | A | 1/1998 | Fung |
| 5,717,319 | A | 2/1998 | Jokinen |
| 5,719,800 | A | 2/1998 | Mittal et al. |
| 5,727,208 | A | 3/1998 | Brown |
| 5,737,613 | A | 4/1998 | Mensch, Jr. |
| 5,742,142 | A | 4/1998 | Witt |
| 5,745,375 | A | 4/1998 | Reinhardt et al. |
| 5,752,011 | A | 5/1998 | Thomas et al. |
| 5,754,869 | A | 5/1998 | Holzhammer et al. |
| 5,757,171 | A | 5/1998 | Babcock |
| 5,757,172 | A | 5/1998 | Hunsdorf et al. |
| 5,760,636 | A | 6/1998 | Noble et al. |
| 5,764,110 | A | 6/1998 | Ishibashi |
| 5,774,703 | A | 6/1998 | Weiss et al. |
| 5,774,704 | A | 6/1998 | Williams |
| 5,778,237 | A | 7/1998 | Yamamoto et al. |
| 5,787,011 | A | 7/1998 | Ko |
| 5,796,313 | A | 8/1998 | Eitan |
| 5,812,860 | A | 9/1998 | Horden et al. |
| 5,815,724 | A | 9/1998 | Mates |
| 5,825,674 | A | 10/1998 | Jackson |
| 5,825,972 | A | 10/1998 | Brown |
| 5,847,552 | A | 12/1998 | Brown |
| 5,848,281 | A | 12/1998 | Smalley et al. |
| 5,864,225 | A | 1/1999 | Bryson |
| 5,884,049 | A | 3/1999 | Atkinson |
| 5,884,068 | A | 3/1999 | Conary et al. |
| 5,894,577 | A | 4/1999 | MacDonald et al. |
| 5,913,067 | A | 6/1999 | Klein |
| 5,923,545 | A | 7/1999 | Nguyen |
| 5,926,394 | A | 7/1999 | Nguyen et al. |
| 5,933,649 | A | 8/1999 | Lim et al. |
| 5,940,785 | A | 8/1999 | Georgiou et al. |
| 5,940,786 | A | 8/1999 | Steeby |
| 5,952,798 | A | 9/1999 | Jones et al. |
| 5,974,557 | A | 10/1999 | Thomas et al. |
| 5,977,763 | A | 11/1999 | Loughmiller et al. |
| 5,978,926 | A | 11/1999 | Ries et al. |
| 5,996,083 | A | 11/1999 | Gupta et al. |
| 5,996,084 | A | 11/1999 | Watts |
| 6,005,904 | A | 12/1999 | Knapp et al. |
| 6,011,403 | A | 1/2000 | Gillette |
| 6,023,776 | A | 2/2000 | Ozaki |
| 6,025,737 | A | 2/2000 | Patel et al. |
| 6,035,357 | A | 3/2000 | Sakaki |
| 6,035,407 | A | 3/2000 | Gebara et al. |
| 6,040,668 | A | 3/2000 | Huynh et al. |
| 6,047,248 | A | 4/2000 | Georgiou et al. |
| 6,065,126 | A | 5/2000 | Tran et al. |
| 6,065,131 | A | 5/2000 | Andrews et al. |
| 6,124,732 | A | 9/2000 | Zilic et al. |
| 6,134,167 | A | 10/2000 | Atkinson |
| 6,141,762 | A | 10/2000 | Nicol et al. |
| 6,157,247 | A | 12/2000 | Abdesselem et al. |
| 6,163,583 | A | 12/2000 | Lin et al. |
| 6,167,524 | A | 12/2000 | Goodnow et al. |
| 6,167,529 | A | 12/2000 | Dalvi |
| 6,172,943 | B1 | 1/2001 | Yuzuki |
| 6,211,727 | B1* | 4/2001 | Carobolante ................. 327/543 |
| 6,216,234 | B1 | 4/2001 | Sager et al. |
| 6,219,795 | B1 | 4/2001 | Klein |
| 6,229,747 | B1 | 5/2001 | Cho et al. |
| 6,242,936 | B1 | 6/2001 | Ho et al. |
| 6,243,656 | B1 | 6/2001 | Arai et al. |
| 6,255,974 | B1 | 7/2001 | Morizio et al. |
| 6,304,824 | B1 | 10/2001 | Bausch et al. |
| 6,310,912 | B1 | 10/2001 | Maiocchi et al. |
| 6,311,287 | B1 | 10/2001 | Dischler et al. |
| 6,360,327 | B1 | 3/2002 | Hobson |
| 6,363,490 | B1 | 3/2002 | Senyk |
| 6,366,157 | B1* | 4/2002 | Abdesselem et al. ......... 327/535 |
| 6,369,557 | B1 | 4/2002 | Agiman |
| 6,407,571 | B1 | 6/2002 | Furuya et al. |
| 6,415,388 | B1 | 7/2002 | Browning et al. |
| 6,422,746 | B1 | 7/2002 | Weiss et al. |
| 6,425,086 | B1 | 7/2002 | Clark et al. |
| 6,426,641 | B1 | 7/2002 | Koch et al. |
| 6,448,815 | B1 | 9/2002 | Talbot et al. |
| 6,456,049 | B2 | 9/2002 | Tsuji |
| 6,457,134 | B1 | 9/2002 | Lemke et al. |
| 6,470,289 | B1 | 10/2002 | Peters et al. |
| 6,476,632 | B1 | 11/2002 | La Rosa et al. |
| 6,484,041 | B1 | 11/2002 | Aho et al. |
| 6,489,796 | B2 | 12/2002 | Tomishima |
| 6,535,424 | B2 | 3/2003 | Le et al. |
| 6,535,986 | B1 | 3/2003 | Rosno et al. |
| 6,600,575 | B1 | 7/2003 | Kohara |
| 6,621,242 | B2 | 9/2003 | Huang et al. |
| 6,630,754 | B1 | 10/2003 | Pippin |
| 6,650,074 | B1 | 11/2003 | Vyssotski et al. |
| 6,650,740 | B1 | 11/2003 | Adamczyk et al. |
| 6,657,504 | B1 | 12/2003 | Deal et al. |
| 6,662,775 | B2 | 12/2003 | Hauser |
| 6,668,346 | B1 | 12/2003 | Schulz et al. |
| 6,674,587 | B2 | 1/2004 | Chhabra et al. |
| 6,678,831 | B1 | 1/2004 | Mustafa et al. |
| 6,690,219 | B2 | 2/2004 | Chuang |
| 6,703,803 | B2 | 3/2004 | Ohiwa et al. |
| 6,714,891 | B2 | 3/2004 | Dendinger |
| 6,718,496 | B1 | 4/2004 | Fukuhisa et al. |
| 6,721,892 | B1 | 4/2004 | Osborn et al. |
| 6,737,860 | B2 | 5/2004 | Hsu et al. |
| 6,748,408 | B1 | 6/2004 | Bredin et al. |
| 6,774,587 | B2 | 8/2004 | Makaran et al. |
| 6,792,379 | B2 | 9/2004 | Ando |
| 6,794,836 | B2 | 9/2004 | Strothmann et al. |
| 6,795,075 | B1 | 9/2004 | Streitenberger et al. |
| 6,795,927 | B1 | 9/2004 | Altmejd et al. |
| 6,799,134 | B2 | 9/2004 | Borchers et al. |
| 6,801,004 | B2 | 10/2004 | Frankel et al. |
| 6,804,131 | B2 | 10/2004 | Galbiati et al. |
| 6,806,673 | B2 | 10/2004 | Ho |
| 6,815,938 | B2 | 11/2004 | Horimoto |
| 6,815,971 | B2 | 11/2004 | Wang et al. |
| 6,831,448 | B2 | 12/2004 | Ishii et al. |
| 6,836,849 | B2 | 12/2004 | Brock et al. |
| 6,837,063 | B1 | 1/2005 | Hood, III et al. |
| 6,853,259 | B2 | 2/2005 | Norman et al. |
| 6,853,569 | B2 | 2/2005 | Cheng et al. |

(56) References Cited

U.S. PATENT DOCUMENTS

| | | | |
|---|---|---|---|
| 6,885,233 B2 | 4/2005 | Huard et al. | |
| 6,889,331 B2 | 5/2005 | Soerensen et al. | |
| 6,889,332 B2 | 5/2005 | Helms et al. | |
| 6,914,492 B2 | 7/2005 | Hui et al. | |
| 6,938,176 B1 | 8/2005 | Alben et al. | |
| 6,947,865 B1 | 9/2005 | Mimberg et al. | |
| 6,970,798 B1 | 11/2005 | Cao et al. | |
| 6,975,087 B1 | 12/2005 | Crabill et al. | |
| 6,976,112 B2 | 12/2005 | Franke et al. | |
| 6,985,025 B1 | 1/2006 | Maksimovic et al. | |
| 6,987,370 B2 | 1/2006 | Chheda et al. | |
| 6,990,594 B2 | 1/2006 | Kim | |
| 7,003,421 B1 | 2/2006 | Allen, III et al. | |
| 7,005,894 B2 | 2/2006 | Weder | |
| 7,024,568 B2 * | 4/2006 | Maksimovic et al. | 713/300 |
| 7,042,296 B2 | 5/2006 | Hui et al. | |
| 7,043,649 B2 | 5/2006 | Terrell, II | |
| 7,045,993 B1 | 5/2006 | Tomiyoshi | |
| 7,051,215 B2 | 5/2006 | Zimmer et al. | |
| 7,061,292 B2 * | 6/2006 | Maksimovic et al. | 327/277 |
| 7,068,557 B2 | 6/2006 | Norman et al. | |
| 7,071,640 B2 | 7/2006 | Kurosawa et al. | |
| 7,095,288 B2 | 8/2006 | Smith | |
| 7,100,061 B2 | 8/2006 | Halepete et al. | |
| 7,112,978 B1 | 9/2006 | Koniaris et al. | |
| 7,119,522 B1 | 10/2006 | Tomiyoshi | |
| 7,122,978 B2 | 10/2006 | Nakanishi et al. | |
| 7,129,745 B2 | 10/2006 | Lewis et al. | |
| 7,129,763 B1 | 10/2006 | Bennett et al. | |
| 7,149,903 B1 | 12/2006 | Chan et al. | |
| 7,149,909 B2 | 12/2006 | Cui et al. | |
| 7,180,322 B1 | 2/2007 | Koniaris et al. | |
| 7,215,590 B1 * | 5/2007 | Borden et al. | 365/226 |
| 7,256,571 B1 | 8/2007 | Mimberg et al. | |
| 7,256,788 B1 | 8/2007 | Luu et al. | |
| 7,334,198 B2 | 2/2008 | Ditzel et al. | |
| 7,336,090 B1 | 2/2008 | Koniaris et al. | |
| 7,336,092 B1 | 2/2008 | Koniaris et al. | |
| 7,348,827 B2 | 3/2008 | Rahim et al. | |
| 7,348,836 B1 | 3/2008 | Velmurugan | |
| 7,363,176 B2 | 4/2008 | Patel et al. | |
| 7,409,570 B2 | 8/2008 | Suzuoki | |
| 7,414,450 B2 | 8/2008 | Luo et al. | |
| 7,423,475 B2 * | 9/2008 | Saha et al. | 327/543 |
| 7,490,256 B2 | 2/2009 | Marshall et al. | |
| 7,501,868 B2 | 3/2009 | Ito | |
| 7,509,504 B1 | 3/2009 | Koniaris et al. | |
| 7,574,613 B2 | 8/2009 | Holle et al. | |
| 7,596,708 B1 | 9/2009 | Halepete et al. | |
| 7,639,033 B2 * | 12/2009 | Rahim et al. | 324/765 |
| 7,725,749 B2 | 5/2010 | Mitarai | |
| 7,739,531 B1 | 6/2010 | Krishnan | |
| 7,849,332 B1 | 12/2010 | Alben et al. | |
| 7,886,164 B1 | 2/2011 | Alben et al. | |
| 8,125,261 B2 | 2/2012 | Nomura | |
| 8,134,356 B2 | 3/2012 | Dobberpuhl et al. | |
| 8,370,663 B2 | 2/2013 | Frid et al. | |
| 8,566,627 B2 | 10/2013 | Halepete et al. | |
| 8,775,843 B2 | 7/2014 | Frid et al. | |
| 8,806,247 B2 | 8/2014 | Halepete et al. | |
| 2001/0033504 A1 | 10/2001 | Galbiati et al. | |
| 2001/0045779 A1 | 11/2001 | Lee et al. | |
| 2002/0002689 A1 | 1/2002 | Yeh | |
| 2002/0026597 A1 | 2/2002 | Dai et al. | |
| 2002/0029352 A1 | 3/2002 | Borkar et al. | |
| 2002/0032829 A1 | 3/2002 | Dalrymple | |
| 2002/0049920 A1 | 4/2002 | Staiger | |
| 2002/0073348 A1 | 6/2002 | Tani | |
| 2002/0083356 A1 | 6/2002 | Dai | |
| 2002/0087896 A1 | 7/2002 | Cline et al. | |
| 2002/0099964 A1 | 7/2002 | Zdravkovic | |
| 2002/0113622 A1 | 8/2002 | Tang | |
| 2002/0116650 A1 | 8/2002 | Halepete et al. | |
| 2002/0138778 A1 | 9/2002 | Cole et al. | |
| 2002/0178390 A1 | 11/2002 | Lee | |
| 2002/0194509 A1 | 12/2002 | Plante et al. | |
| 2003/0030483 A1 | 2/2003 | Seki et al. | |
| 2003/0036876 A1 | 2/2003 | Fuller, III et al. | |
| 2003/0065960 A1 | 4/2003 | Rusu et al. | |
| 2003/0074591 A1 | 4/2003 | McClendon et al. | |
| 2003/0079151 A1 | 4/2003 | Bohrer et al. | |
| 2003/0093160 A1 * | 5/2003 | Maksimovic et al. | 700/14 |
| 2003/0110423 A1 | 6/2003 | Helms et al. | |
| 2003/0133621 A1 | 7/2003 | Fujii et al. | |
| 2003/0189465 A1 | 10/2003 | Abadeer et al. | |
| 2004/0025061 A1 | 2/2004 | Lawrence | |
| 2004/0032414 A1 | 2/2004 | Jain et al. | |
| 2004/0073821 A1 | 4/2004 | Naveh et al. | |
| 2004/0105237 A1 | 6/2004 | Hoover et al. | |
| 2004/0105327 A1 | 6/2004 | Tanno | |
| 2004/0123170 A1 | 6/2004 | Tschanz et al. | |
| 2004/0128631 A1 | 7/2004 | Ditzel et al. | |
| 2005/0007047 A1 | 1/2005 | Strothmann et al. | |
| 2005/0057230 A1 | 3/2005 | Saha et al. | |
| 2005/0062507 A1 * | 3/2005 | Naffziger et al. | 327/105 |
| 2005/0071705 A1 | 3/2005 | Bruno et al. | |
| 2005/0218871 A1 | 10/2005 | Kang et al. | |
| 2005/0268141 A1 | 12/2005 | Alben et al. | |
| 2005/0268189 A1 | 12/2005 | Soltis, Jr. | |
| 2005/0289367 A1 | 12/2005 | Clark et al. | |
| 2006/0074576 A1 | 4/2006 | Patel et al. | |
| 2007/0220289 A1 | 9/2007 | Holle et al. | |
| 2007/0229054 A1 * | 10/2007 | Dobberpuhl et al. | 324/76.11 |
| 2007/0234088 A1 | 10/2007 | Marshall et al. | |
| 2007/0257710 A1 | 11/2007 | Mari et al. | |
| 2007/0296440 A1 | 12/2007 | Takamiya et al. | |
| 2008/0143372 A1 | 6/2008 | Koniaris et al. | |
| 2008/0186082 A1 * | 8/2008 | Singh et al. | 327/539 |
| 2008/0189561 A1 * | 8/2008 | Singh | 713/300 |
| 2008/0204158 A1 | 8/2008 | Weder | |
| 2009/0015232 A1 * | 1/2009 | Rozen et al. | 323/318 |
| 2010/0019834 A1 | 1/2010 | Zerbe et al. | |
| 2010/0318828 A1 | 12/2010 | Elting et al. | |
| 2015/0022272 A1 | 1/2015 | Felix et al. | |

FOREIGN PATENT DOCUMENTS

| | | |
|---|---|---|
| EP | 0501655 | 9/1992 |
| EP | 0632360 | 1/1995 |
| EP | 0978781 | 2/2000 |
| EP | 1096360 | 5/2001 |
| EP | 1182538 | 2/2002 |
| EP | 1182556 | 2/2002 |
| EP | 1398639 | 3/2004 |
| GB | 2342471 | 4/2000 |
| GB | 2393540 | 3/2004 |
| GB | 2404792 | 2/2005 |
| JP | H07129277 | 5/1995 |
| JP | 409185589 | 7/1997 |
| JP | 10-187300 | 7/1998 |
| JP | 2000284862 | 10/2000 |
| JP | 3076234 | 3/2001 |
| JP | 2003122459 | 4/2003 |
| JP | 2003195981 | 7/2003 |
| WO | 0127728 | 4/2001 |
| WO | 03079171 | 9/2003 |

OTHER PUBLICATIONS

Migdal, et al.; "A Processor Temperature and ODE Adjustment System and Method", U.S. Appl. No. 10/295,748, filed Nov. 14, 2002.

Mobile Pentium(R) III Processors—Enhanced Intel(R) SpeedStep(TM) Technology, http://support.intel.com/support/processors/mobile/pentiumiii/tti004.htm, Sep. 12, 2002, pp. 1-4.

Mobile Pentium(R) III Processors—Thermal Diode, http://suppori/intel.com/support/processors/mobile/pentiumiii/diode.htm, Sep. 12, 2002, pp. 1-2.

Mobile Pentium(R) III Processors—Thermal Management, http://supporT/intel.com/support/processors/mobile/pentiumiii/ thermal.htm, Sep. 12, 2002, pp. 1-4.

"Computer Software", Wikipedia, http://en.wikipedia.org/wiki/software, retrieved May 2, 2007.

(56) References Cited

OTHER PUBLICATIONS

"High Speed, Digitally Adjusted Stepdown Controllers for Notebook CPUS", Maxim Manual, pp. 11 & 21.
Alben, et al.; NVID-P000764; A Processor Speed Adjustment System and Method; U.S. Appl. No. 10/449,942, filed May 30, 2003.
Alben, et al.; NVID-P000765; A Processor Voltage Adjustment System and Method; U.S. Appl. No. 10/448,891, filed May 30, 2003.
Baker, K. et al.; "Wafer Burn-In Isolation Circuit" IBM Technical Disclosure Bulletin, IBM Corp., New York, US, vol. 32, No. 6B, Nov. 1, 1989, pp. 442-443, XP00073858 ISSN: 0018-8689, the whole document.
Baker, K. et al.; 'Shmoo Plotting: The Black Art of IC Testing, IEEE Design and Test of Computers, IEEE vol. 14, No. 3; Jul. 1, 1997; pp. 90-97; XP000793305 ISSNL 0740-7475, the whole document.
Calavert, J.B., "The Phase-Locked Loop", Jul. 24, 2001, http://www.du.edu/~etuttle/electron/elect12.htm.
Grishman, Ralph; Lecture Notes, "Computer System Design-Spring 2002", "Lecture 2: Combinational Logic Design", 2002, Department of Computer Science, New York University.
Operation U (Refer to Functional Diagram), LTC 1736 Linear Technology Manual, p. 9.
Kelleher, et al.; NVID-P000620; A Processor Performance Adjustment System and Method; U.S. Appl. No.10/295,619, filed Nov. 14, 2002.
Laplante, P. Comprehensive Dictionary of Electrical Engineering, CRC Press, IEEE Press, pp. 164-165.
Microsoft Technology Inc. Linear Voltage Fan Speed Control Using Microchips TC64X Family, pp. 1-4, 2003.
Migdal, et al.; "A Processor Temperature and Ode Adjustment System and Method", U.S. Appl. No. 10/295,748, filed Nov. 14, 2014.
Oner, H et al.; "A Compact Monitoring Circuit for Real-Time-On-Chip Diagnosis of Hot-Carrier Induced Degradation". Microelectronics Test Structures, 1997. ICMTS 1997. Proceedings, IEEE International Conference on Monterey, CA Mar. 17, 1993-Mar. 20, 1997, pp. 72-76.
Govil, K. et al.; "Comparing Algorithms for Dynamic Speed-Setting of a Low-Power PCU"; International Computer Science Institute; Berkeley, CA; Apr. 1995.
Hong, I. et al.; Synthesis Techniques for Low-Power Hard Real-Time Systems on Variable Voltage Processors; Real-Time System Symposium Proceedings. Dec. 1998.
Hong, I. et al.; Power Optimization of Variable Voltage Core-Based Systems; Jun. 1998; Design Automation Conference Proceedings.
Mobile Pentium(R) III Processors—Enhanced Intel(R) SpeedStep(TM) Technology, http://support/intel.com/support/processors/mobile/pentiumiii/tti004.htm, Sep. 12, 2002, pp. 1-4.
Mobile Pentium(R) III Processors—Thermal Diode, http://support/intel.com/support/processors/mobile/pentiumiii/diode.htm, Sep. 12, 2002, pp. 1-2.
Mobile Pentium(R) III Processors—Thermal Management, http://support/intel.com/support/processors/mobile/pentiumiii/thermal.htm, Sep. 12, 2002, pp. 1-4.
Intel, Intel Pentium 4 Processor in the 423-pin Package, pp. 78-80, (Date believed prior to Nov. 14, 2002).

* cited by examiner

MAINTAINING OPTIMUM VOLTAGE SUPPLY TO MATCH PERFORMANCE OF AN INTEGRATED CIRCUIT

BACKGROUND

1. Field of Disclosure

The present disclosure relates generally to integrated circuits (ICs), and more specifically to a technique for maintaining an optimum voltage supply to match the performance of an IC.

2. Related Art

Integrated circuits (ICs) generally require a supply voltage for operation. As is well known, signal propagation (of analog or digital signals) in an IC may be associated with a delay depending generally on factors such as process variations during fabrication of the IC, power supply voltage, and operating/junction temperature. Such signal propagation delays generally characterize the "performance" of an IC, often termed as silicon performance (delay performance).

As an illustration, a high supply voltage generally leads to low propagation delays generally permitting a higher frequency of operation, but at the cost of higher power consumption. On the other hand, a low supply voltage leads to lower power consumption, but may cause higher propagation delays and a correspondingly lower frequency of operation. Such delays (in general, the performance of an IC) vary depending also on other factors such as those noted above.

There is a recognized need to provide an optimal power supply voltage to an IC matching the performance of the IC, such that power consumption is minimized while still ensuring that a desired frequency of operation is supported. Further, it is also desirable to maintain the power supply at correspondingly optimal levels in spite of performance variations during operation of the IC.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention maintains a power supply provided to an IC (or a portion of an IC) at an optimum value matching the performance of the IC. In an embodiment, a voltage control block periodically measures the delay performance of the IC for a same frequency of operation of the IC, thereby permitting adjustment of the power supply to match performance variations. The power supply may thus be maintained at an optimum value in spite of temporal performance variations.

According to yet another aspect of the present invention, a voltage control block is implemented as a separate unit from a processor core in the IC. As a result, there is minimal requirement for processor time (in processor core) and/or resources for the dynamic voltage control/adjustment, thereby freeing the processor core for executing user applications.

The features of the invention will be clearer in comparison to a prior approach not implementing one or more of the features. Accordingly, the description is continued with respect to a prior approach.

2. Prior Art

Figure 1:
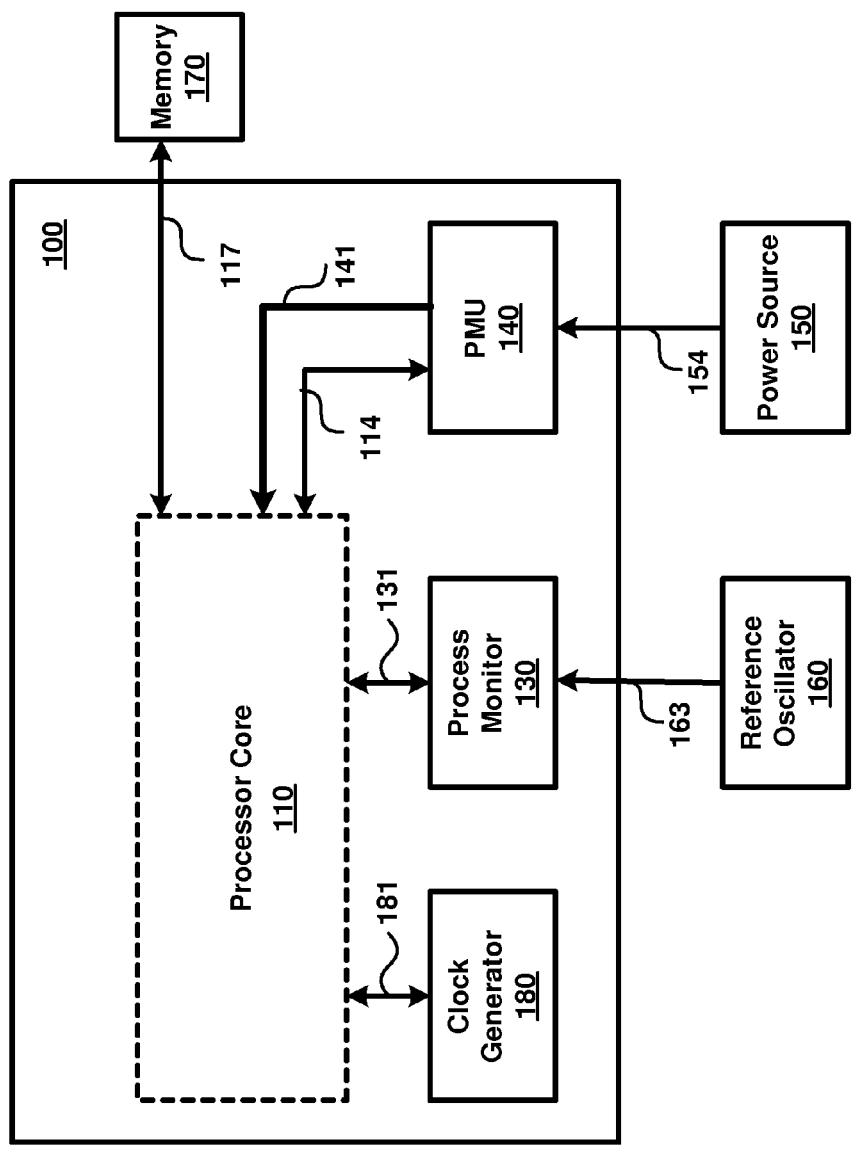
FIG. 1 is a block diagram illustrating an example prior system in which a power supply voltage matching integrated circuit (IC) performance is provided.

FIG. 1 is a block diagram illustrating a prior system in which a power supply voltage matching IC performance is to be provided. IC 100 is shown containing processor core 110, process monitor 130, power management unit (PMU) 140, and clock generator 180. In addition, the diagram is shown containing power source 150, reference oscillator 160 and memory 170. Each component and the manner in which voltage control is provided is described below briefly.

Power source 150 is a source of power supply to IC 100 including processor core 110, and may be implemented as a battery. In addition, or in the alternative, a regulated power supply which generates a DC voltage from a AC supply, may also be used in power source 150. Power source 150 may generate a voltage level (e.g., 12V) on path 154.

PMU 140 receives input power (e.g., 12V noted above) from power source 150 (via path 154), and generates one of several voltage levels on path 141 as power supply voltage to processor core 110. PMU 140 may be programmed via path 114 to select a desired one of the voltage levels on path 141. In addition, PMU 140 may also provide voltage regulation for the voltage supplied on path 141. Although PMU 140 is shown as being contained within IC 100, in other embodiments PMU 140 may be implemented as a separate unit outside of (external to) IC 100.

Reference oscillator 160 provides a stable and accurate reference clock (for example, a digital square waveform) to process monitor 130 (on path 163) to measure performance of processor core 110 as described below. Clock generator 180 provides a clock to processor core 110 on path 181, and may be programmable to select a desired operating clock frequency.

Memory 170 may be implemented as any of different memory types such as random access memory (RAM), read-only memory (ROM), flash memory etc, and may be used to store and provide instructions and data to processor core 110 via path 117.

Processor core 110 may contain one or more processing units (e.g., central processing units (CPU) containing arithmetic and logic blocks, registers, control and sequencing logic etc.), and represents a region of semiconductor circuitry in IC 100 whose power supply voltage is to be controlled. Processing units in processor core 110 may retrieve software instructions as well as data from memory 170, and execute the instructions to implement a desired feature (software functionality) or user applications in general.

Processor core 110 may operate in one of different process corners due to the variations (or unpredictability) in the semiconductor manufacturing processes, temperature, voltage, etc. As a general rule, the speed of operation of processor core 210 is low if the corresponding process corner is weak and the speed of operation is high if the process corner is strong.

Process monitor 130 determines the silicon performance of IC 100 and provides the corresponding information to processor core 110. Process monitor 130 may contain a ring oscillator coupled to a counter, and determines the number of oscillation periods (count) of a ring oscillator during a fixed (predetermined) number of clock cycles of reference oscillator 160. The measured number may be provided to processor core 110.

Since processor core 110 and process monitor 130 may be constructed on a same semiconductor die, and also since power supply to both processor core 110 and process monitor 130 may be provided (routed) via a same power grid, the count value of the ring oscillator provides a measure of the silicon performance of processor core 110. The (sequence of) operations used to measure the silicon performance of processor core 110 are described briefly next.

Software (program/code/instructions) executing on processor core 110 selects (and sets) a frequency of operation (frequency of operating clock 181) to be used for processor core 110 for a corresponding program (set of instructions) to be executed. Generally, programs involving high levels of processing, such as real-time signal processing, video image manipulation, etc., require a higher frequency.

Software then sends instructions to process monitor 130 on path 131 to perform a silicon performance measurement. The instructions may be provided, for example, in the form of a value to program a register within process monitor 130, with the programming causing process monitor 130 to initiate a performance measurement.

Process monitor 130 then enables the ring oscillator to oscillate for a period of time corresponding to a predetermined number of cycles(count interval) of reference oscillator 160, which causes a counter to count the number of oscillations in that period. At the end of the count interval, process monitor 130 interrupts processor core 110. Software then reads the count value in the counter. Based on the count value, software specifies to PMU 140 the desired value of voltage to be provided on path 141. In response, PMU 140 sets the desired voltage on path 141.

In the prior technique described above, it may be noted that software intervention (i.e., processor core 110) is required to cause the desired voltage to be provided to processor core 110. This may not be desirable as processor time and/or resources need to be diverted for this purpose. Further, the performance measurement and voltage selection may be performed only once whenever a new value of clock frequency on path 181 is required to be set. Silicon performance of IC 100 (or portions of it including processor core 110) may, however, change with time (often faster than software can respond) due to reasons such as change in temperature etc., as is well known.

The present invention overcomes at least some of the shortcomings of the prior approach, and is described in sections below.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

3. Dynamic Voltage Control

Figure 2:
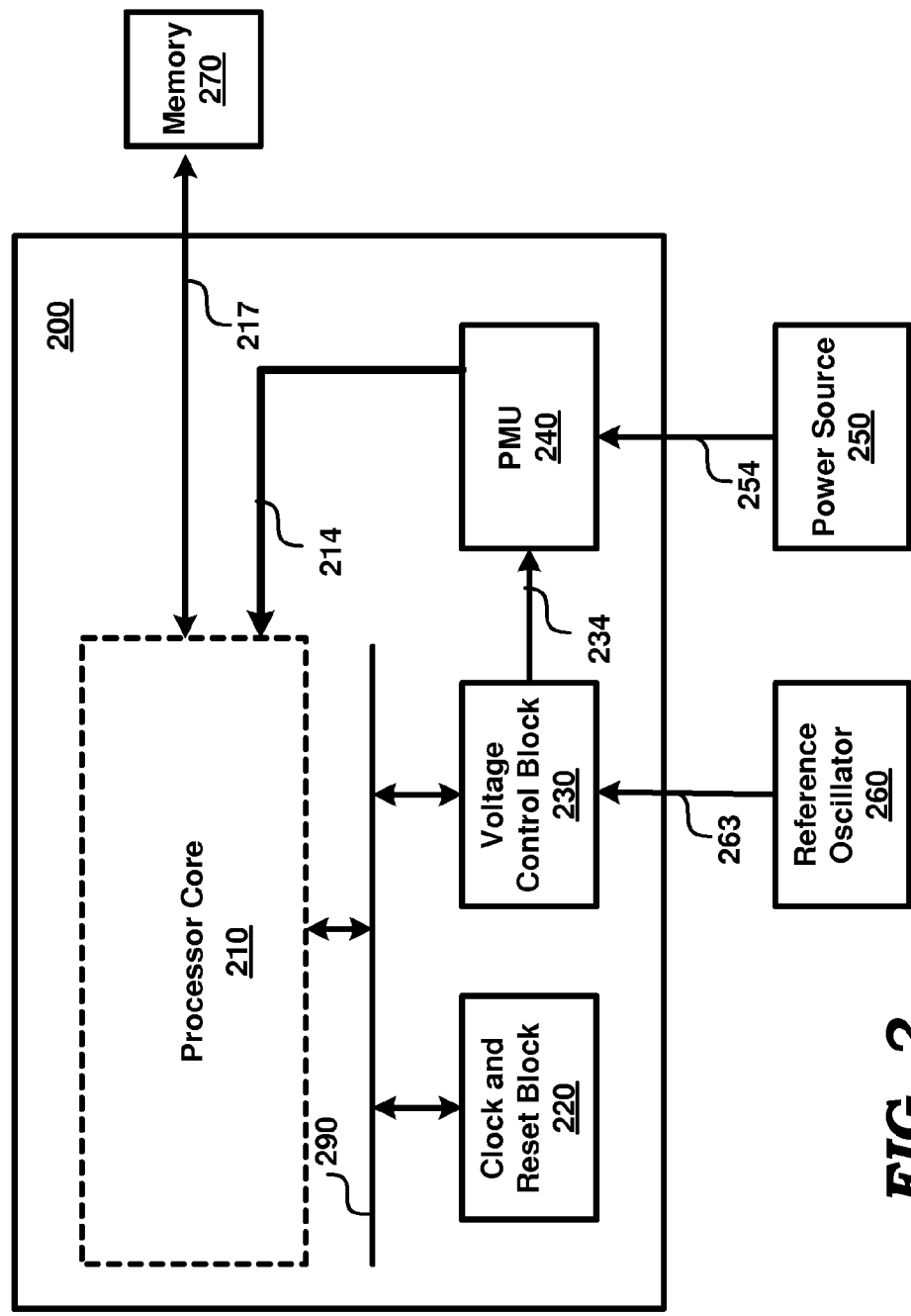
FIG. 2 is a block diagram of an example environment in which an optimum voltage supply matching the performance of an IC may be maintained according to several aspects of the present invention.

FIG. 2 is a block diagram of an example environment in which an optimum voltage supply matching the performance of an IC may be maintained according to several aspects of the present invention. The example environment is shown containing only representative systems for illustration. However, real-world environments may contain many more systems/components as will be apparent to one skilled in the relevant arts. In addition, some of the blocks may be implemented in different ICs or other external circuits, and some of the components shown external to the IC may be integrated into IC 200 shown there. Implementations in such environments are also contemplated to be within the scope and spirit of various aspects of the present invention.

Further, while the environment illustrates a digital IC, it must be understood that one or more features of the invention are applicable to mixed-signal ICs as well. IC 200, which may be a digital IC, is shown containing processor core 210, clock-and-reset block 220, voltage control block 230, power management unit (PMU) 240. In addition, the diagram is shown containing power source 250, reference oscillator 260 and memory 270. Each component is described next.

Processor core 210, reference oscillator 260, power source 250, and memory 270 may be implemented (and operated) similar to processor core 110, reference oscillator 160, power source 150, and memory 170 of FIG. 1, and the description is not repeated in the interest of conciseness.

Clock and reset block 220 provides an operating clock to processor core 210 via bus 290, and may be programmable by software via bus 290 to select a desired operating clock frequency. Clock and reset block 220 also provides power-ON reset to processor core 210. As noted above, processor core 210/110 may determine a specific frequency as suited for the specific user application being executed, and control clock and reset block 220 to provide a clock signal with that specific frequency.

PMU 240 receives input power from power source 250 (via path 254), and generates one of several voltages on path 214 as power supply voltage to processor core 210. PMU 240 may be programmable by voltage control block 230 via path 234 to select a desired one of the voltage levels on path 214, and may also provide voltage regulation for the voltage supplied on path 214. In addition, PMU 240 may also provide supply voltages to other components shown in FIG. 2. Further, although PMU 240 is shown as being implemented within IC 200, in other embodiments PMU 240 may be implemented as a separate unit outside of IC 200.

Voltage control block 230 receives a stable and accurate reference clock on path 263 from reference oscillator 260 for measuring silicon performance of processor core 210 described in detail below. Voltage control block 230 also receives a selected frequency of operation(of processor core 210) from clock and reset block 220 via bus 290 (or alternatively from software executing in processor core 210), determines an optimal voltage for processor core 210, and forwards the optimal voltage value to PMU 240 via path 234 to cause the voltage to be set on path 214, as described next.

4. Flowchart

Figure 3:
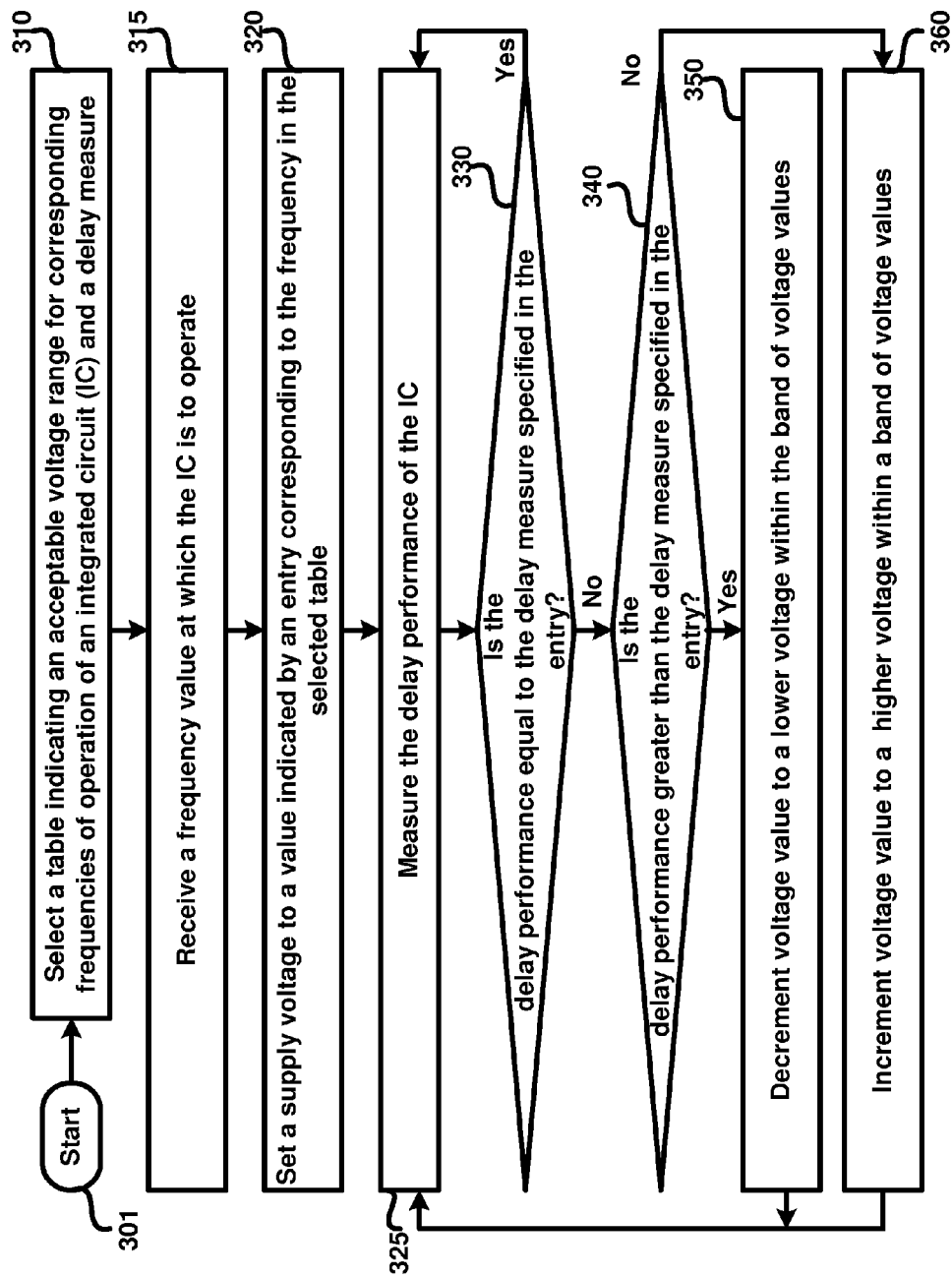
FIG. 3 is a flowchart illustrating the manner in which an optimal voltage may be maintained according to several aspects of the present invention.

FIG. 3 is a flowchart illustrating the manner in which an optimal voltage may be provided and maintained for processor core 210 according to several aspects of the present invention. The flowchart is described with respect to FIG. 2 and voltage control block 230, merely for illustration. However, various features can be implemented in other environments and with other components. Furthermore, the steps are described in a specific sequence merely for illustration.

Alternative embodiments in other environments, using other components/different combinations of components, and different sequence of steps can also be implemented without departing from the scope and spirit of several aspects of the present invention, as will be apparent to one skilled in the relevant arts by reading the disclosure provided herein. The description is provided with respect to maintaining an optimal voltage for processor core 210 merely as an example. It must be understood that the description holds true for any portion of IC 200 as well as for the whole of IC 200 as well. The flowchart starts in step 301, in which control passes immediately to step 310.

In step 310, voltage control block 230 selects a table indicating an acceptable voltage range for corresponding frequencies of operation of processor core 210 and a delay measure. In an embodiment, multiple tables may be stored in voltage control block 230, with each table containing entries for voltages ranges and corresponding delay measures for a corresponding process corner. The tables and their content may be determined during testing of the fabricated and packaged chips based on the fabrication technology and specific implementations to account for all possible ranges of process variations. A specific one of the tables may then be selected at the time of initialization (power on) of a device incorporating IC 200. A description of an example table and the manner in which voltage control block 230 selects a table is provided in sections below. Control then passes to step 315.

In step 315, voltage control block 230 receives a frequency value at which processor core 210 is to operate. In an embodiment, processor core 210 (or the software instructions executing on processor core 210) provides a desired frequency value to clock and reset block 220. Clock and reset block 220 forwards the value to voltage control block 230 as described below. Alternatively, processor core 210 may provide the frequency value to voltage control block 230 as well. Control then passes to step 320.

In step 320, voltage control block 230 causes the supply voltage to processor core 210 to be set to a value indicated by an entry corresponding to the received frequency value in the selected table. In an embodiment, voltage control block 230 selects an entry corresponding to the received frequency value, and from the entry retrieves a "safe" voltage value (generally a value at which processor core 210 is guaranteed to operate), and forwards the value to PMU 240, which in turn sets the supply voltage to that value. In an embodiment, the safe voltage equals the highest voltage permitted by the range in the entry retrieved in step 310. Control then passes to step 325.

In step 325, voltage control block 230 measures the delay performance of processor core 210. In an embodiment described in detail below, voltage control block 230 enables a ring counter to count for period of time corresponding to a predetermined number of cycles(count interval) of reference oscillator 260. The value of the count at the end of the count interval serves as a measure of the delay performance as described above with respect to FIG. 1. Control then passes to step 330.

In step 330, voltage control block 230 checks if the delay performance (count) is equal to a corresponding delay measure in the selected table. If the delay performance is not equal to the delay measure, it may indicate that the supply voltage provided to processor core 210 is not at an optimal value, and control passes to step 340. On the other hand, if the delay performance is equal to (or very nearly equal, depending on how finely the delay performance and delay measures may be obtained in the specific environment/implementation), it may indicate that the supply voltage is at or very near the optimal value (again limited only by how finely the supply voltage may be set) control passes to step 325.

In step 340, voltage control block 230 checks if the delay performance (count) is greater than the delay measure. A delay performance (count) greater than the delay measure may indicate a supply voltage greater than an optimal value, and control passes to step 350. A delay performance (count) smaller than the delay measure may indicate a supply voltage lower than an optimal value, and control passes to step 360.

In step 350, voltage control block 230 selects a lower supply voltage value within the range of voltage values specified in the entry, and provides it to PMU 240. PMU 240 then sets the power supply voltage to the lower value. In an embodiment, voltage control block 230 selects a next lower value determined by the granularity of voltage settings allowed by PMU 240. In an alternative embodiment, selection of a lower voltage is made according to an exponential relationship. Control then passes to step 325, in which voltage control block 230 again measures the delay performance.

In step 360, voltage control block 230 selects a higher supply voltage value within the range of voltage values specified in the entry, and provides it to PMU 240. PMU 240 then sets the power supply voltage to the higher value. In an embodiment, voltage control block 230 selects a next higher value determined by the granularity of voltage settings allowed by PMU 240. Control then passes to step 325, in which voltage control block 230 again measures the delay performance.

It may be appreciated from the description above, that voltage control block 230 operates to adjust the power supply voltage to a value such that the delay performance is made equal to (or as close as possible to) the delay measure. Further, once a frequency of operation is selected (and set), voltage control block 230 repeats steps 325, 330, 340, 350 and 360 as applicable, continuously, so as to maintain the supply voltage of processor core 210 at (or nearest) the optimal value.

Thus, the optimum value of power supply voltage may be maintained (by continuous adjustment) even if the delay performance of processor core 210 were to change (for the same operating frequency), for example, due to effects of temperature variations. Processor core 210 may thus operate at a desired frequency while still minimizing power consumption.

Due to the implementation of voltage control block 230 and processor core 210 as separate blocks (i.e., one can execute substantially independently and in parallel to the other), the periodic/frequent voltage adjustments do not require substantial resources outside of voltage control block 230, and thus processor core 210 can continue to dedicate resources to user applications.

Further, it may be noted that software intervention (i.e., intervention of processor core 210) may not be needed to adjust the supply voltage once a frequency of operation is specified. Since voltage control block 230 may be implemented as a separate block from processor core 210, this ensures that processing time (and resources) of processor 210 need not be diverted for voltage adjustment, thus freeing up processor core 210 for other tasks such as executing user applications.

An example table used to store the voltage range and delay measure entries, and also the manner in which the table may be selected is described next.

5. Voltage Table

Figure 4:
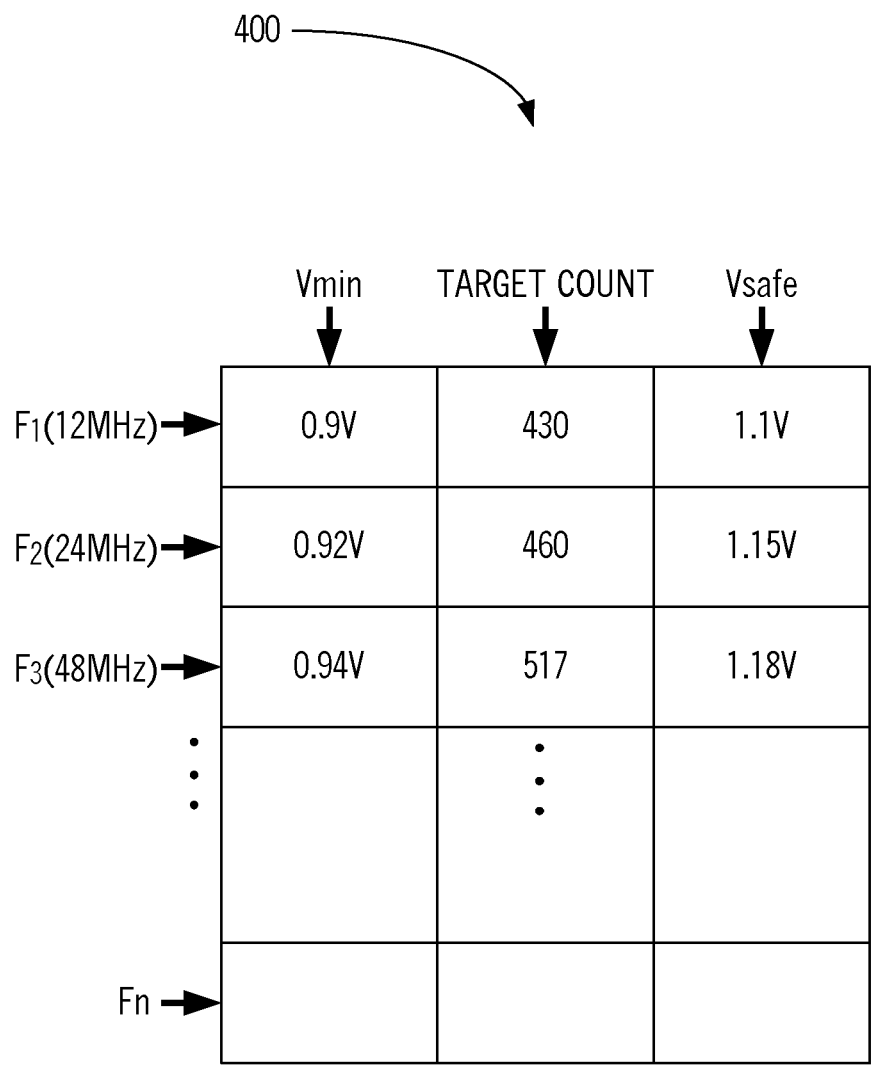
FIG. 4 shows an example table that may be used to store voltage values and delay measures for corresponding frequency values in an embodiment.

FIG. 4 shows an example table (voltage table) that may be used to store voltage values and delay measures for corresponding frequency values. Table 400 may be contained in voltage control block 230, and is shown containing columns marked 'Vmin', 'Target Count' and 'Vsafe', and rows marked F1 through Fn. Entries in table 400 represent corresponding values for a single process corner. Tables containing entries for other process corners may also be contained in voltage control block 230.

Each row contains corresponding entries for a corresponding frequency value (F1 to Fn). In general, a desired frequency range (i.e., Fn to F1) may be determined in advance depending on factors such as design of processor core 210, throughput requirements of user applications to be executed, etc.

Column 'Target Count' contains the delay measure entries for the corresponding frequencies. The delay measure generally represents a desired (or closest) value of count that may be obtained by using a ring oscillator and counter during a performance measurement in a manner described above.

Column Vmin contains the lowest supply voltage value (value below which operation may not guaranteed) that may be used to ensure proper operation of processor core 210 at the frequency. Column Vsafe contains the 'safe' supply voltage value (generally a value at which operation is guaranteed) for processor core 210 at the corresponding frequency. Vmin and Vsafe values may be determined by testing/characterization.

The difference between Vsafe and Vmin for a particular frequency of operation generally represents a band (range) of voltage values that may be supplied to power processor core 210. However, the specific value which is optimum in terms of power consumption may be selected and provided by voltage control block 230 in the manner described above.

The voltage range and delay measure entries may be determined during testing after fabrication.

Example entries are shown for three frequency values. The row corresponding to frequency 'F1' (value 12 Megahertz) is shown containing a Vmin entry 0.9V (volts), Target Count entry of 430, and Vsafe entry of 1.1 V. The row corresponding to frequency 'F2' (value 24 MHz) is shown containing a Vmin entry 0.92V (volts), Target Count entry of 460, and Vsafe entry of 1.15 V. The row corresponding to frequency 'F3' (value 48 MHz) is shown containing a Vmin entry 0.94V (volts), Target Count entry of 517, and Vsafe entry of 1.18 V.

As an example, assuming voltage control block 230 receives a frequency value 'F2' (value 24 MHz) in step 315 of the flowchart in FIG. 3, voltage control block 230 may initially provide a supply voltage value of 1.15V (Vsafe) to PMU 240 (step 320). Voltage control block 230 may then take a measurement of the delay performance of processor core 210. Assuming a delay performance (count) measured has a value 480 (which is greater than the desired value 460 specified in column 'Target Count', voltage control block 230 may determine a lower voltage (for example a next lower voltage 1.14V allowed by the granularity of settings in PMU 240, but within the range (0.92 to 1.15V), and forward the value of 1.14V to PMU 240 (step 350).

Voltage control block 230 continues to take measurements (e.g., at periodic intervals, with the period of the intervals being programmable, which may be determined by a designer/user, and provided to voltage control block 230 by processor core 210 of the delay performance. If at a later iteration of step 325, voltage control block 230 obtains a count of value less than the desired value of 460, voltage control block 230 may increase the voltage value to a higher voltage (for example, a next higher value allowed by the granularity of settings in PMU 240).

Thus, voltage control block 230 may operate continuously (or at periodic intervals) to adjust the supply voltage till the measured count substantially equals the value 460, at which point the power supply voltage provided to processor core 210 corresponds to the optimum value. Further, even if the delay performance were to change with time for the same operating frequency, voltage control block 230 can operate to adjust the supply voltage to the optimal value.

In an embodiment, voltage tables corresponding to different process corners are stored in voltage control block 230. The tables may be stored in hardcoded form in voltage control block 230 during production (or after testing), or may be provided to voltage control block 230 in the form of data in a suitable manner (for example via processor core 210) not shown.

After power-ON, voltage control block 230 sets various voltage values (in sequence) for each value of operating frequency for processor core 210, and takes corresponding measurements (delay measure counts) at each voltage setting. Voltage control block 230 then selects the table that contains entries closest to those obtained above. In general, the table selected corresponds to (i.e., entries nearest in values to) the process corner from which IC 200 (and processor core 210) was obtained.

The internal details of voltage control block 230 in an embodiment are described next.

6. Voltage Control Block

Figure 5:
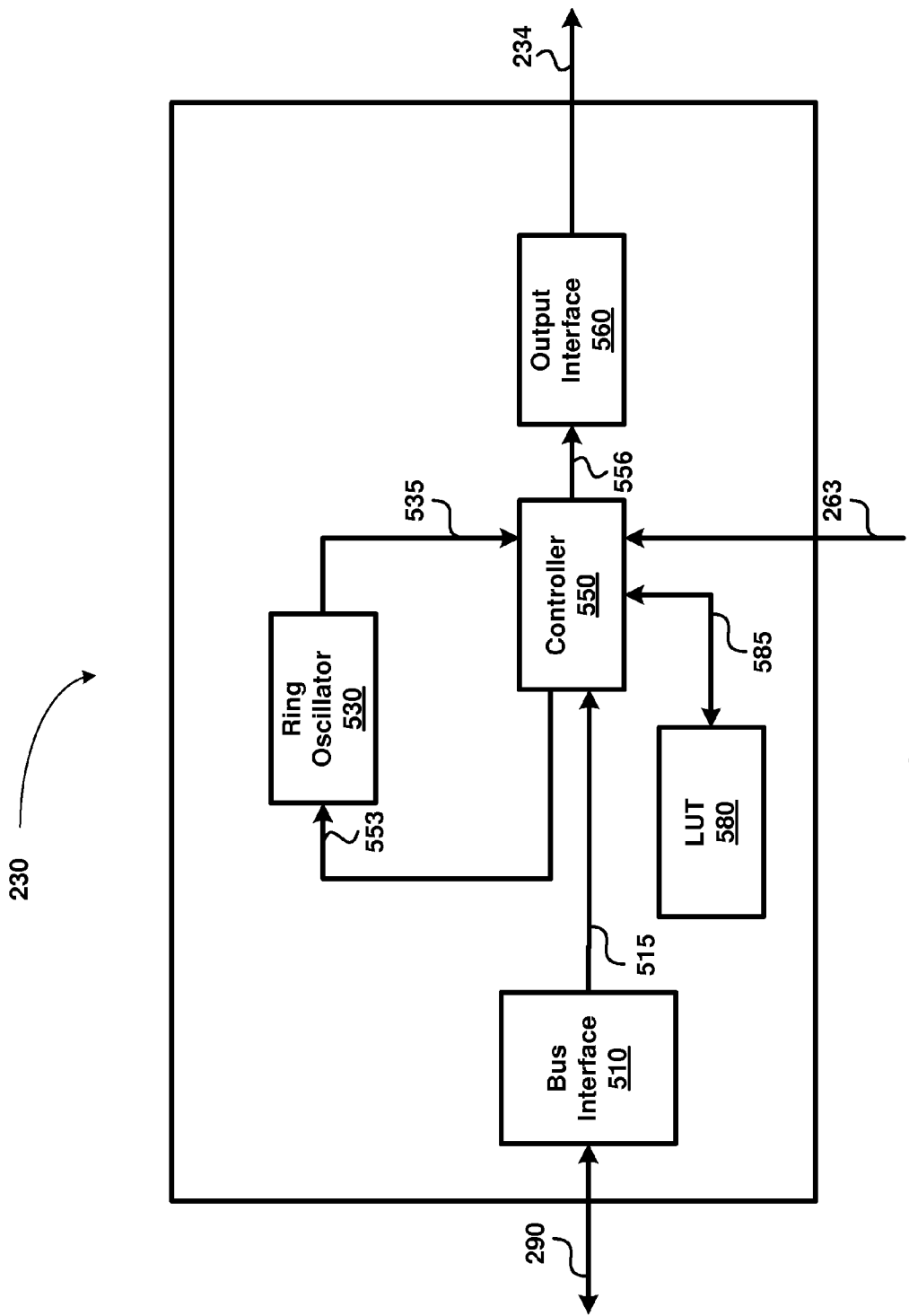
FIG. 5 is a block diagram of a voltage control block in an embodiment of the present invention.

FIG. 5 is a block diagram of a voltage control block in an embodiment of the present invention. Voltage control block 230 is shown containing bus interface 510, ring oscillator 530, controller 550, output interface 560, and look-up table (LUT) 580. Each component is described in detail below.

Bus interface 510 provides a communication interface between voltage control block 230 and units in IC 200 such as processor core 210 and clock and reset block 220 (FIG. 2). Bus interface 510 communicates with controller 550 via path 515.

Output interface 560 provides a communication interface between voltage control block 230 and PMU 240 (path 234, FIG. 2). In an embodiment, output interface 560 is implemented as an I$^2$C interface.

LUT 580 may be implemented as a register bank or small sized memory and is used to store the voltage tables described above. The voltage tables may either be hardcoded during fabrication, or downloaded (programmed) to LUT 580 via bus interface 510 from an external storage (not shown) at any point in time. Controller 550 may retrieve voltage table entries from LUT 580 via path 585.

Ring oscillator 530 may be implemented as a sequence (chain) of inverters (odd number) connected in a sequence, with the output of the last inverter being fed back to the input of the first inverter. Each inverter may be provided with a control input (path 553) to enable or disable oscillations. The output of the last inverter in the chain is provided to a counter in controller 550 via path 535. Bus interface 510, ring oscillator 530, output interface 560, and look-up table (LUT) 580 may be implemented in a known way.

Controller 550 receives a frequency value (via bus interface 510, and paths 290 and 515) at which processor core 210 is to be operated, retrieves the entries corresponding to the frequency value to determine an optimal supply voltage value as described above. The particular table from which the entries are retrieved may be selected during power-ON/initialization, also as described above. Alternatively, the table may be selected at a later time point after power-ON. Controller 550 receives a stable and accurate reference clock from reference oscillator 260 (FIG. 2) via path 263, and provides voltage values to PMU 240 via output interface 560 and paths 556 and 234.

Controller 550 may contain a hysteresis counter to minimize oscillations while adjusting the power supply voltage values as described above. In general, hysteresis is employed to dampens oscillations in closed-loop feedback systems. For example, in the description above, performance of silicon (e.g., processor core 210) may oscillate around a desired target value, potentially causing voltage control block 230 to perform successive repeated sequences of increment and decrement (increment followed by decrement followed by increment in a continuous loop). Hysteresis counter provided within controller 550 keeps a count of successive voltage decrement decisions, and enables a decrement only if a sequence of 'n' decrement decisions have been taken (where the value of n may be programmable). Thus, in an example embodiment, implementation of the hysteresis counter favors increment over decrement thereby eliminating the above sequence to a first order. An example timing diagram illustrating the manner in which controller 550 measures a delay performance of processor core 210 is described next.

7. Measuring Delay Performance

Figure 6:
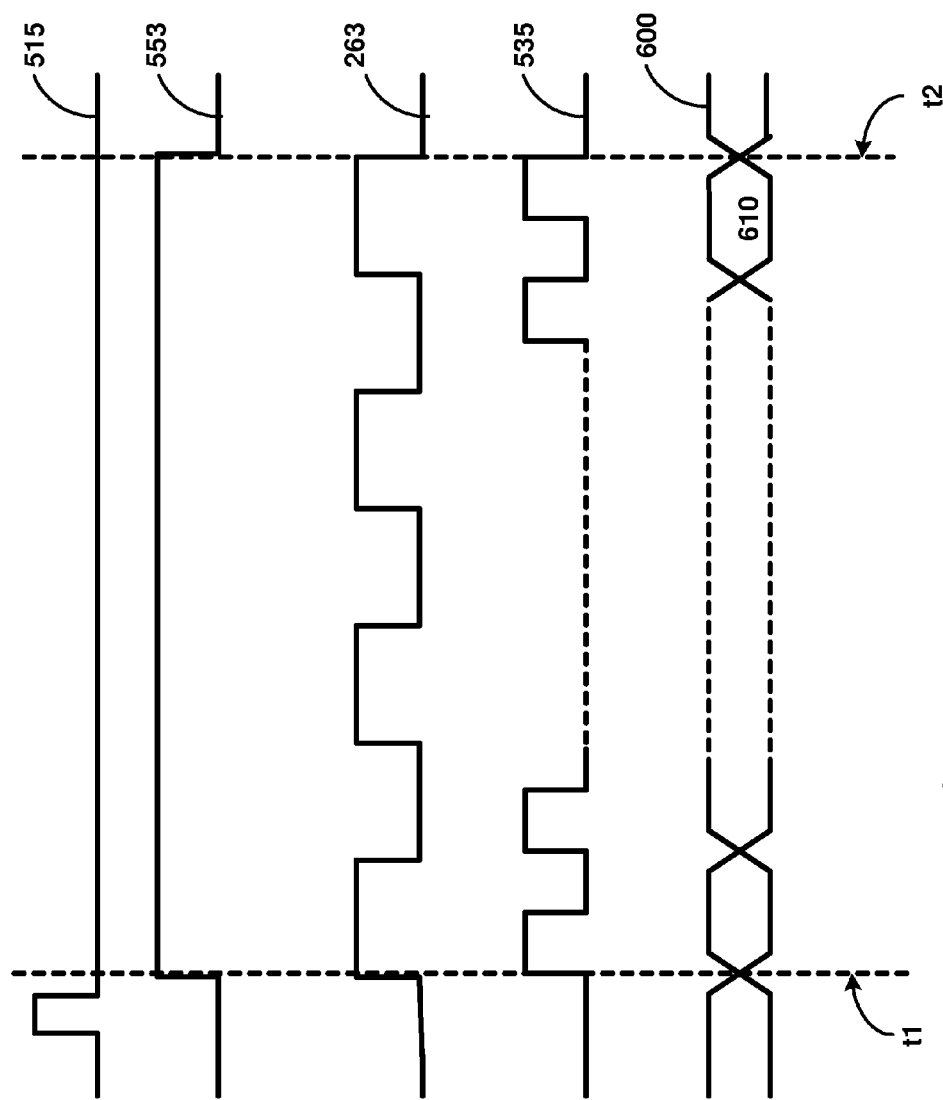
FIG. 6 is an example timing diagram illustrating a delay performance measurement in an embodiment.

FIG. 6 is an example timing diagram illustrating a delay performance measurement in an embodiment. The description of the timing diagram is provided with respect to components/signal paths in voltage control block 230 described above.

Waveform 515 represents a signal (e.g., a trigger) that may be received from clock and reset block 220 (FIG. 2) via bus 290. Slightly before time instance t1 waveform 515 is shown as pulsing high. The 'high' pulse indicates to controller 550 (FIG. 5) that a performance measurement is to be done. Typically, clock and reset block 220 sends a trigger pulse whenever a new frequency is to be set for processor core 210. However, either clock and reset block 220 or processor core 210 may send the trigger pulse at any time.

In response to the high pulse of waveform 515, controller 550 asserts signal 553 to logic high to enable ring oscillator 530. Controller 550 enables counting (counter values are shown by waveform 600) of the ring oscillator output (waveform 535) for a predetermined number of cycles of reference oscillator waveform 263. At the end of a count interval (at time instance t2), controller 550 disables counting, and notes the final count value (field 610). Controller 550 may then operate in a manner described above to provide an optimal voltage supply value for processor core 210.

IC 200 implementing one or more features of the present invention may be implemented as part of a system, as described briefly next.

8. Example Device/System

Figure 7:
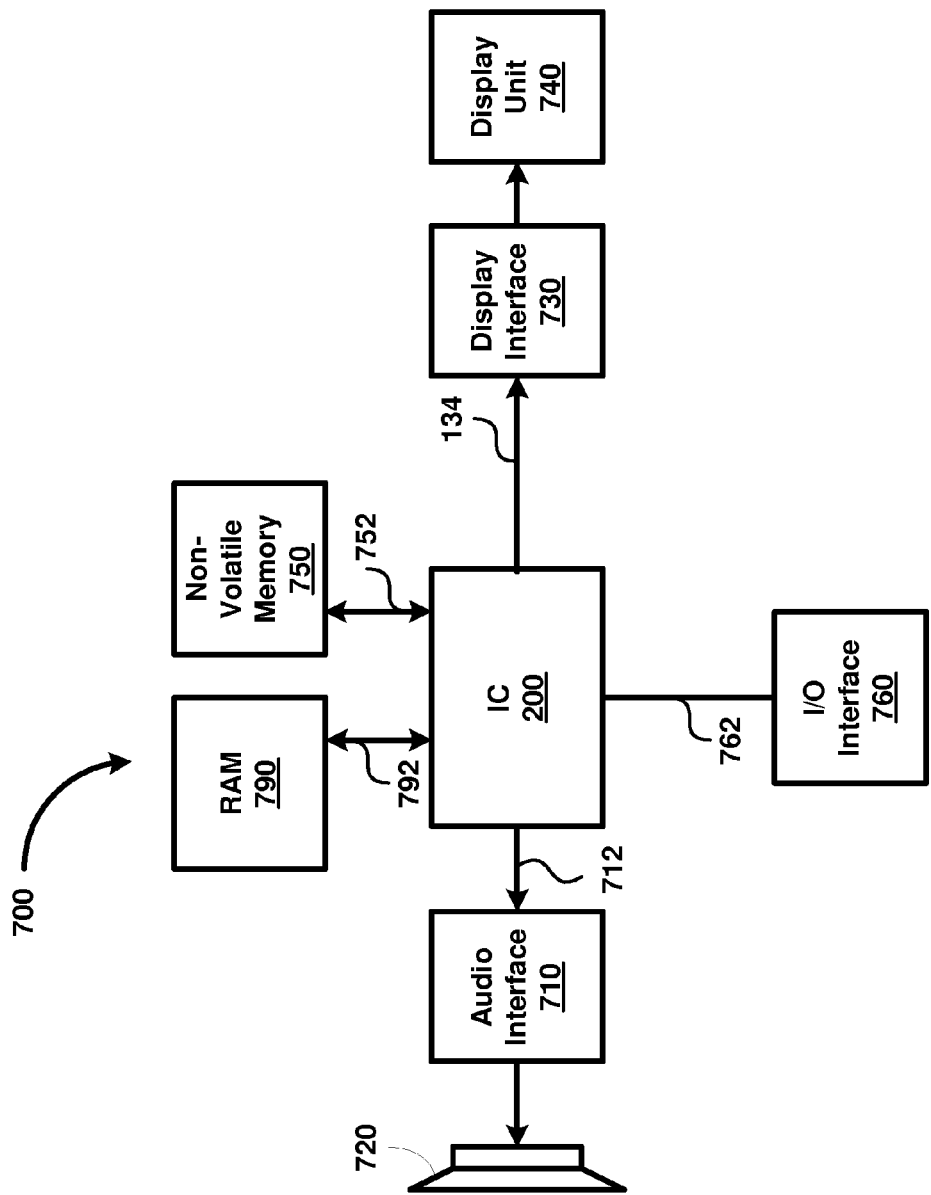
FIG. 7 is a block diagram of an example system containing an IC implemented according to several aspects of the present invention.

FIG. 7 is a block diagram of an example system in which several features of the present invention may be implemented. System 700, which may for example be a hand-held battery operated system (e.g., MP3 player, camera, mobile phone etc.) is shown containing IC 200, audio interface 710, speaker 720, display interface 730, display unit 740, non-volatile memory 750, I/O interface 760 and random access memory (RAM) 790. Other components such as a reference oscillator and a power supply are also assumed to be contained in system 700, but not shown for the sake of clarity.

RAM 790 and non-volatile memory 750 may be collectively referred to as memory and may be used to provide instructions and data to IC 200. In general, user applications and data may be stored in RAM 790 and/or non-volatile memory 750. The user applications may contain instructions to provide features such as playing audio/video/image signals (or recording the same).

Audio interface 710 (example of an output interface through which output signals are provided) interfaces speaker 720 to IC 200, and may be used to render audio data (e.g., MP3 music). Display interface 730 provides an interface between IC 200 and a display unit 740, and may be used to provide a graphical user interface to facilitate operation of system 700. I/O interface 760 may provide general purpose input and output interfaces (e.g., keyboard, mouse, etc.,) to enable a user to interact with system 700.

IC 200 may be implemented according to several aspects of the present invention to operate system 700 at an optimum power supply voltage to minimize power consumption, while still operating at a desired speed/frequency, as described with examples above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of providing voltage to an integrated circuit (IC), said method comprising:
   accessing a look-up table comprising values of a plurality of operating frequencies of said IC, a plurality of acceptable supply voltage ranges, and a plurality of predetermined delay measures, wherein each operating frequency is associated with a respective supply voltage of said plurality of supply voltages, and further with a respective acceptable voltage range and with a respective predetermined delay measures;
   setting a supply voltage value to a selected value based on a selected operating frequency of said IC and based on said look-up table, wherein said supply voltage value is within an acceptable voltage range associated with said selected operating frequency;
   measuring a delay performance of said IC associated with said selected value;
   comparing said delay performance to a predetermined delay measure associated with said selected operating frequency;
   lowering said supply voltage value to a voltage value below said selected value if said delay performance is greater than said predetermined delay measure;
   increasing said supply voltage value to a voltage value higher than said selected value if said delay performance is less than said predetermined delay measure; and
   performing said measuring more than once and in response thereto performing said lowering and said increasing respectively if said selected operating frequency remains unchanged.

2. The method of claim 1, wherein said performing comprises performing said measuring periodically.

3. The method of claim 2, wherein said look-up table is selected from a plurality of look-up tables, wherein each of said plurality of look-up table is associated with a corresponding process corner, and wherein said look-up table is selected prior to said setting.

4. The method of claim 1, wherein said increasing and said lowering are performed in accordance with hysteresis to reduce oscillations in a closed-loop feedback system.

5. The method as described by claim 1, wherein said predetermined delay measure associated with said selected operating frequency is determined during fabrication of said IC.

6. The method as described by claim 1, wherein said lowering and said increasing is based on a granularity level of a power measurement unit.

7. The method of claim 3, wherein said plurality of tables is stored in a register bank comprised in said IC.

8. The method of claim 3, wherein said plurality of tables is stored in a memory comprised in said IC.

9. The method of claim 3, wherein said plurality of tables is hardcoded during fabrication of said IC.

10. The method of claim 3, wherein said plurality of tables is downloaded from an external storage with respect to said IC.

11. The method of claim 1, wherein said lowering said supply voltage value comprises:
selecting a voltage value below said selected value according to an exponential relationship between said selected value and said voltage value below said selected value; and
setting said supply voltage value to said voltage value below said selected value.

12. The method of claim 1 wherein said predetermined delay measure is determined during testing after fabrication of said integrated circuit.

13. A system comprising:
a processing unit operable to execute instructions;
a power management unit (PMU) coupled to said processing unit;
a voltage control block coupled to said processing unit and said PMU, wherein said voltage control block comprises:
a look-up table storing values of a plurality of operating frequencies of said processing unit, a plurality of acceptable voltage ranges, and a plurality of predetermined delay measures of said processing unit, wherein each operating frequency is associated with a respective acceptable voltage range and with a respective predetermined delay measure in said look-up;
a ring oscillator operable to measure a delay performance of said processing unit;
a controller operable to setting a supply voltage value to based on a selected operating frequency of said processing unit based on said look-up table, wherein said supply voltage value is within an acceptable voltage range associated with said selected operable frequency;
wherein said voltage control block is further configured to:
compare said delay performance to a predetermined delay measure associated with said selected operating frequency, wherein said predetermined delay measure is determined after fabrication of said processing unit; and
communicate said supply voltage value to said PMU, wherein said PMU is configured to control a voltage provided by a power source to said processing unit based on said supply voltage value and a predetermined delay measure associated with said selected operating frequency, wherein said voltage control block is separate from said processing unit.

14. The system of claim 13, wherein said voltage control block is operable to control and adjust said voltage provided by said power source to said processing unit multiple times during a time period over which said selected operating frequency remains unchanged.

15. The system of claim 13 further comprising:
an input interface operable to receive said selected operating frequency associated with said processing unit; and
an output interface operable to communicate said operating voltage to said PMU.

16. The system of claim 15, wherein said controller comprises a hysteresis counter operable to reduce oscillations during voltage adjustment provided by said power source to said processing unit.

17. The system of claim 13, wherein said processing unit and said voltage control block are within an integrated circuit.

18. The system as described by claim 13, wherein said voltage control block is operable to cause said PMU to lower said voltage provided by said power source if a delay performance of said processing unit associated with said voltage provided by said power source is greater than a delay measure associated with said operating voltage.

19. The system as described by claim 13, wherein said voltage control block is operable to cause said PMU to increase said voltage provided by said power source if a delay performance of said processing unit associated with said voltage provided by said power source is less than a delay measure associated with said operating voltage.

20. The system as described by claim 13, wherein said voltage control block is operable to control said voltage provided by said power source independent of said processing unit.

21. The system of claim 15, wherein said look-up table is stored in a register bank comprised in said voltage control block.

22. The system of claim 15, wherein said look-up table is stored in a memory comprised in said voltage control block.

23. The system of claim 15, wherein said look-up table is hardcoded during fabrication of said system.

24. The system of claim 15, wherein said look-up table is downloaded from an external storage with respect to said system.

25. An apparatus for providing voltage supply to an integrated circuit (IC), said apparatus comprising:
means for accessing a look-up table comprising a plurality of operating frequencies, a plurality of acceptable voltage ranges, and a plurality of predetermined delay measures, wherein each operating frequency is associated with a respective acceptable voltage range and with a respective predetermined delay measure;
means for setting a supply voltage value to a selected value based on a selected operating frequency of said IC based on said look-up table, wherein said supply voltage is within an acceptable voltage range associated with said selected operation frequency;
means for measuring a delay performance of said IC associated with said selected value;
means for comparing said delay performance to a predetermined delay measure associated with said selected operating frequency, wherein said predetermined delay measure is determined after fabrication of said integrated circuit;
means for lowering said supply voltage value to a voltage value below said selected value if said delay performance is greater than said predetermined delay measure; and
means for increasing said supply voltage value to a voltage value higher than said selected value if said delay performance is less than said delay predetermined measure, wherein said means for measuring is operable to measure said delay performance more than once and in response thereto said means for increasing said supply voltage and said means for lowering said supply voltage are operable to adjust said supply voltage if said selected operating frequency remains unchanged.

26. The apparatus of claim 25 further comprising:
means for receiving a clock frequency associated with said selected operating frequency;
means for identifying said acceptable voltage range associated with said selected operating frequency, wherein said increasing and said lowering of said supply voltage value is within said acceptable voltage range.

27. The apparatus of claim 25, wherein said look-up table is selected from a plurality of tables, wherein each table is associated with a corresponding process corner, and wherein table selection occurs prior to said setting.

28. The apparatus as described by claim 25, wherein said means for lowering and said means for increasing are based on granularity level of a power measurement unit.

29. The apparatus of claim 27, wherein said plurality of tables is stored in a register bank comprised in said IC.

30. The apparatus of claim 27, wherein said plurality of tables is stored in a memory comprised in said IC.

31. The apparatus of claim 27, wherein said plurality of tables is hardcoded during fabrication of said IC.

32. The apparatus of claim 27, wherein said plurality of tables is downloaded from an external storage with respect to said IC.

33. The apparatus of claim 25, wherein said means for lowering said supply voltage value comprises:
means for selecting a voltage value below said selected value according to an exponential relationship between said selected value and said voltage value below said selected value; and
means for setting said supply voltage value to said voltage value below said selected value.

* * * * *